United States Patent

[11] 3,587,605

| | | |
|---|---|---|
| [72] | Inventor | William L. Verplank<br>Menlo Park, Calif. |
| [21] | Appl. No. | 765,805 |
| [22] | Filed | Oct. 8, 1968 |
| [45] | Patented | June 28, 1971 |
| [73] | Assignee | Foster-Miller Associates<br>Waltham, Mass. |

[54] VORTEX FLUID MIXTURE CONTROL VALVE
7 Claims, 3 Drawing Figs.

[52] U.S. Cl. ................................................ 137/81.5
[51] Int. Cl. ................................................ F15c 1/16
[50] Field of Search.................................... 137/81.5

[56] References Cited
UNITED STATES PATENTS

| | | | |
|---|---|---|---|
| 3,198,431 | 8/1965 | Gesell ........................ | 137/81.5UX |
| 3,216,439 | 11/1965 | Manion ...................... | 137/81.5 |
| 3,383,038 | 5/1968 | Boothe ....................... | 137/81.5X |
| 3,410,287 | 11/1968 | Heyden et al. .............. | 137/81.5X |
| 3,410,291 | 11/1968 | Boothe et al. ............... | 137/81.5 |
| 3,416,550 | 12/1968 | Griffin, Jr. ................... | 137/81.5 |
| 3,447,383 | 6/1969 | Camarata .................... | 137/81.5X |
| 3,452,767 | 7/1969 | Posingies .................... | 137/81.5 |

*Primary Examiner*—Samuel Scott
*Attorney*—Wolf, Greenfield and Sacks

ABSTRACT: A flow regulator having a pair of vortex chambers each having a main tangential inlet and an axial outlet for its own liquid. Secondary tangential inlets for each chamber convey the other liquid, which opposes the swirl of the main liquid in each to achieve controlled proportionality.

PATENTED JUN28 1971 3,587,605

INVENTOR.
WILLIAM L. VERPLANK
BY
Wolf, Greenfield & Hicken
ATTORNEYS

VORTEX FLUID MIXTURE CONTROL VALVE

This invention relates to flow control devices and more particularly comprises a mixture control valve utilizing vortex chambers. The invention has particular application in a shower valve for controlling the mixture of hot and cold water.

In most public accommodations, apartments and modern homes, the hot and cold water temperatures are either constant or vary very slowly. The cause of shower scalding or freezing is usually a rapid change in water pressure in one of the lines. The changes in water pressure change the ratio of flow rates and thus the temperature of the mixture.

At the present time a number of devices are marketed that achieve mixture control by direct temperature measurement and/or by complex double diaphragm or sliding spool differential pressure regulation. These prior art devices, as a result of their complexity, are expensive and/or unreliable.

One important object of this invention is to provide an extremely simple and inexpensive mixture control valve which operates dependably.

Another important object of this invention is to provide a mixture control valve which does not effect the total flow rate of the combined liquids being proportioned.

To accomplish these and other objects, the mixture control valve of this invention includes a pair of chambers each having inlet and outlets for one of the liquids being proportioned. The inlet, outlet and chamber for each liquid is so designed that the flow rate of the liquid discharged from each chamber is an inverse function of the tangential velocity or swirl of the liquid in the chamber. A reference signal is created by the pressure of each liquid before it enters its chamber, which signal varies the swirl of the other liquid in its chamber as an inverse function of that pressure. Consequently, an increase in pressure of one liquid upstream of its chamber causes an increase in the flow rate of the liquids.

These and other objects and features of this invention will be better understood and appreciated from the following detailed description of one embodiment thereof, selected for purposes of illustration and shown in the accompanying drawing, in which.

Figure 1:
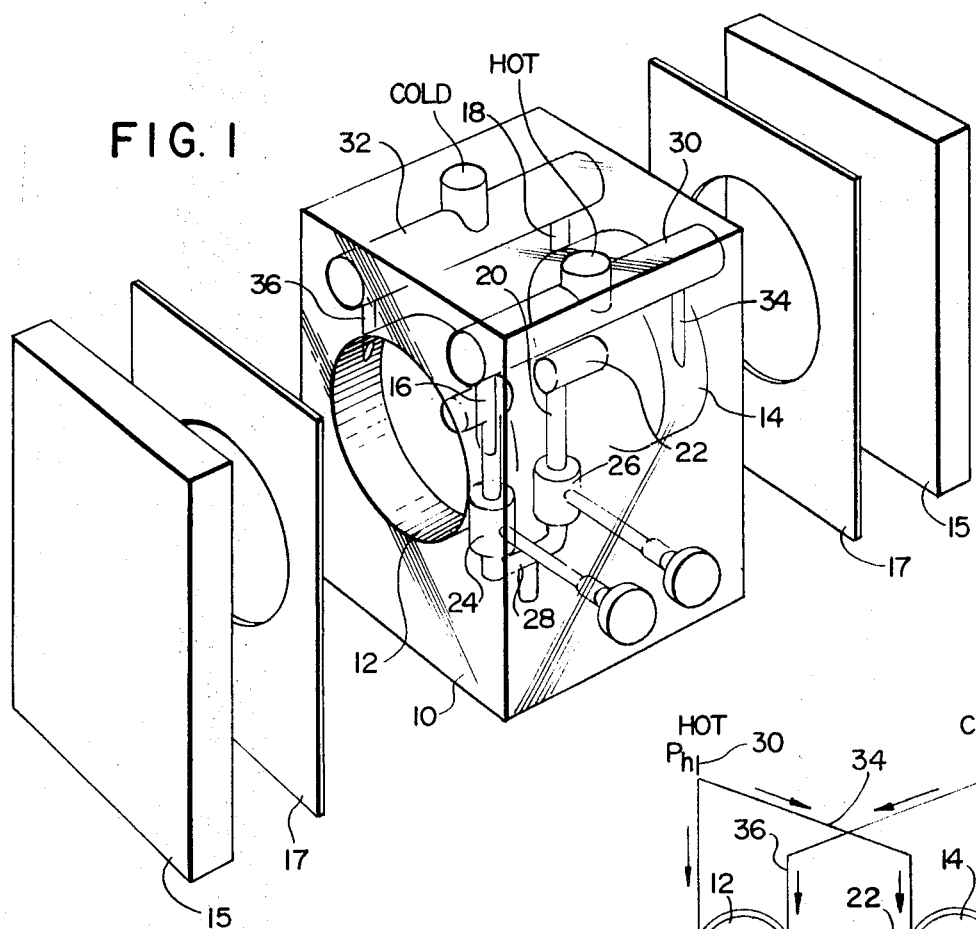
FIG. 1 is an exploded perspective view of a mixture control valve constructed in accordance with this invention.

The embodiment of this invention shown in FIG. 1 is formed in a block 10 in which are provided a pair of shallow cylindrical chambers 12 and 14 designed to handle hot and cold liquids, respectively. Each chamber is closed by an end wall 15 and gasket 17. The chambers have a main tangential inlet duct 16 and 18 respectively, which feed hot and cold water to the respective chambers. The chambers are also provided with outlets 20 and 22 respectively which are joined through temperature and volume control valves 24 and 26 to a common discharge port 28.

The inlet passages 16 and 18 for the hot and cold water are connected through ducts 30 and 32 to the respective water sources. While they are shown in the drawing to be formed in the block-shaped body 10, it is to be understood that the passages may well be formed by separate pipes designed to carry the water supplies, and the chambers 12 and 14 may also each be separately fabricated.

The chambers 12 and 14 form vortex chambers which characteristically provide a discharge flow rate which is an inverse function of the vortex or swirl speed of the liquid in them. Thus, in chamber 12, the flow rate of hot water discharging through outlet 20 is inversely related to the swirl speed of the hot water in the chamber 12 entering through the inlet 16. Consequently, the discharge rate through outlet 20 may be increased by reducing the swirl speed of the liquid. Thus it will be appreciated that the outflow may be increased by increasing the resistance to swirl of the liquid in the chamber 12. This relation is employed in the present invention to achieve the mixture control without the use of moving valve parts etc.

In FIG. 1 the hot water passage 30 which feeds the inlet 16 of chamber 12 is shown to supply a pilot 34 that forms an inlet to the chamber 14, which is oriented tangentially with respect to that chamber and which introduces the pilot liquid in a flow direction opposed to the liquid which enters the chamber 14 through the main inlet 18. Therefore, as the liquid flow through the passage 34 is increased, it increases the resistance to swirl of the main liquid in the chamber 14 and consequently the rate of discharge through the outlet 22 of chamber 14 increases. That is, the increase of flow through passage 34 reduces the swirl in the chamber 14 so as to increase the discharge through the passage 22. A similar arrangement is found in the other vortex chamber. It will be noted that the passage 32 communicates with a pilot line 36 which forms a passage for introducing liquid to the chamber 12 tangentially and in a direction opposed to the liquid which enters the chamber through the main inlet passage 16. Again, by increasing the flow through pilot 36, the swirl of the main liquid entering the passage 12 through inlet 16 decreases and as a result the flow rate through discharge passage 20 increases. Thus, the liquid introduced through the pilots 34 and 36 form variable flow restrictors by opposing the swirl of the main liquids.

Figure 2:
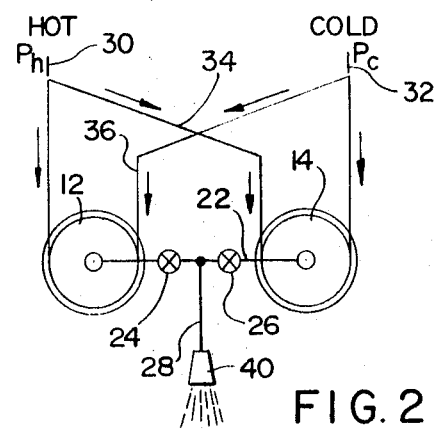
FIG. 2 is a schematic diagram of the valve shown in FIG. 1.
Figure 3:
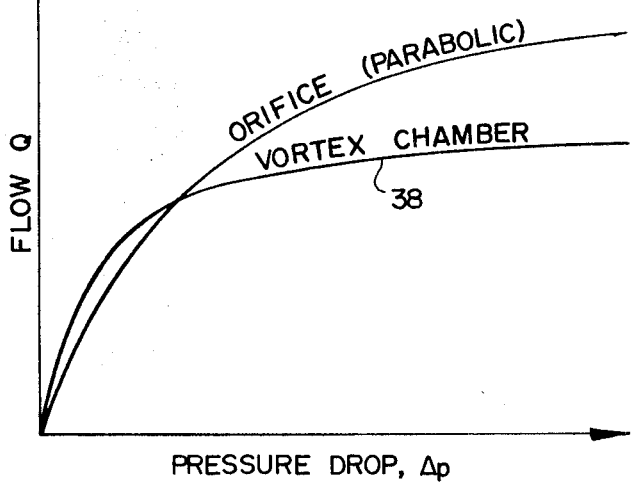
FIG. 3 is a graph comparing the pressure-flow curves of a simple vortex chamber and a simple orifice.

In FIG. 3 pressure-flow curves are illustrated for a simple vortex chamber and a simple orifice. The curve 38 for the vortex chamber indicates that the vortex has inherently better flow regulation characteristics than the orifice, because the flow rate remains substantially constant over a wide range of pressure drops from the inlet passage to the outlet passage of the chamber. The vortex action of the chamber prevents large flow variations even from large pressure variations. By adding a reference signal achieved by the pilots 34 and 36 opposing the vortex action of the main liquid in each part of the system, the characteristic uniform flow of the vortex chamber can be improved. This may best be illustrated with reference to FIG. 2.

In FIG. 2 the hot water source having a line pressure $P_h$ and the cold water source having a line pressure $P_c$ feed their respective vortex chambers 12 and 14, and each chamber discharges through its outlet duct 20 or 22 respectively to the common discharge duct 28 connected to the shower head 40. Each of the hot and cold water sources has a pilot line which produces a reference signal tangentially opposed to the main swirl of liquid in the opposite chambers. With the temperature and volume control valves 24 and 26 open, a constant volume of hot and cold water will be discharged from the vortex chambers 12 and 14 respectively, so that a constant shower temperature will be emitted from the head 40. Assume that the pressure $P_c$ at the cold water source decreases. In the absence of a control of the character provided in accordance with this invention, the drop in pressure $P_c$ would cause the shower temperature to increase, and if the change in $P_c$ is rapid and of substantial magnitude it could produce scalding. However, in accordance with the present invention, if $P_c$ is greater than $P_h$ the decrease in pressure $P_c$ will cause a decrease in the flow through the pilot 36 so as to increase the swirl of the hot water in the vortex chamber 12. Consequently, a decrease in the discharge rate through the outlet passage 20 occurs which effectively balances the decrease in cold water flow through outlet 22 resulting from the decrease in cold water fed to the vortex valve 14. If on the other hand $P_c$ is equal to or less than $P_h$ and $P_c$ decreases, chamber 12 is unaffected, but the decrease of $P_c$ does cause an increase in the flow through the pilot 34 so as to decrease the swirl of the cold water in chamber 14. Consequently the resistance to the decreased pressure $P_c$ is decreased and both the hot and cold flow rates remain substantially constant. Alternatively, if $P_c$ is equal to or greater than $P_h$ and an increase in pressure $P_c$ is experienced, the increased flow from discharge passage 22 balances the increase of the flow out of passage 20 due to the decrease in the swirl rate of the liquid in the vortex chamber 12. If on the other hand $P_c$ is less than $P_h$ and $P_c$ increases, the hot and cold flow rates remain constant due to the increased swirl rate of the liquid in vortex chamber 14.

While the ratio of cross-sectional areas of the two inlets to each vortex chamber and the ratio of the diameters of the chamber to the discharge passage in each half of the valve may vary widely, tests have shown that the valve works exceedingly well when the ratio of the areas of the two inlets, namely, the primary and pilot flow inlets is in the range of 64 to 1. Similarly, a ratio of 10 to 1 of the radii of the chambers 12 and 14 to their respective outlets 20 and 22 has proved most satisfactory.

From the foregoing description it will be appreciated that the several objects of this invention set forth in the introduction are accomplished. The reference signals control the resistance of the vortex actions to achieve a balance in the discharge rates from each chamber. The absence of moving parts obviously promotes trouble free operation, and the fabricating costs of such a flow control device are relatively small. Further, the characteristic action of the vortex chambers promotes uniform flow rates in the system so that variations in pressure in the line do not result in a corresponding change in total discharge.

I claim:

1. A flow regulator for maintaining proportional flow rates of two liquids comprising:
    a first circular chamber having a tangential inlet and an axial outlet for one of the liquids,
    a second circular chamber having a tangential inlet and an axial outlet for the other of the liquids,
    said inlets and outlets and said chambers being arranged so that the flow rate of the liquids leaving the outlets is an inverse function of the swirl of the liquids in the chambers,
    and a reference signal created by the pressure of each liquid before each enters its respective chamber for varying the swirl of the liquid in the other chamber as an inverse function of that pressure.

2. A flow regulator as described in claim 1 further characterized by:
    means connecting the outlets of each chamber to a common outlet.

3. A flow regulator as described in claim 1 further characterized by said reference signal comprising a second inlet in each of said chambers for directing a relatively small quantity of each liquid into the second chamber opposing the swirl of the main liquid entering tangentially into said chamber.

4. A flow regulator as described in claim 3 further characterized by:
    means connecting the outlets of each chamber to a common outlet.

5. A flow regulator as described in claim 3 further characterized by:
    said second inlet being tangentially arranged and oriented in a direction to oppose the swirl of the liquids in the chambers entering the first recited inlets.

6. A flow regulator as described in claim 5 further characterized by:
    a valve associated with each liquid in the inlet or outlet of each chamber for controlling the quantity of each liquid.

7. A flow regulator as described in claim 6 further characterized by:
    the ratio of the cross-sectional areas of the main and second inlet being in the order of 64 to 1.